United States Patent [19]

Ikeura

[11] 4,416,234
[45] Nov. 22, 1983

[54] IGNITION SYSTEM SPARK TIMING CONTROL DURING ENGINE CRANKING

[75] Inventor: Kenji Ikeura, Yokosuka, Japan

[73] Assignee: Nissan Motor Co., Ltd., Yokohama, Japan

[21] Appl. No.: 387,160

[22] Filed: Jun. 10, 1982

Related U.S. Application Data

[63] Continuation of Ser. No. 137,000, Apr. 3, 1980, abandoned.

[30] Foreign Application Priority Data

Apr. 19, 1979 [JP] Japan .................................. 54-47280

[51] Int. Cl.³ .............................................. F02P 5/14
[52] U.S. Cl. .................................... 123/424; 123/421; 123/417
[58] Field of Search ............... 123/416, 417, 418, 421, 123/424, 480

[56] References Cited

U.S. PATENT DOCUMENTS

| | | |
|---|---|---|
| 3,788,291 | 1/1974 | Carter . |
| 3,853,103 | 12/1974 | Wahl et al. . |
| 3,898,894 | 8/1975 | Aono et al. . |
| 3,969,614 | 7/1976 | Moyer et al. . |
| 3,974,815 | 8/1976 | Katsumata . |
| 3,978,833 | 9/1976 | Crall et al. . |
| 4,008,378 | 2/1977 | Sakamoto .......................... 123/416 |
| 4,009,699 | 3/1977 | Hetzler et al. . |
| 4,015,565 | 4/1977 | Aono et al. . |
| 4,084,240 | 4/1978 | Lappington . |
| 4,102,310 | 7/1978 | Caron . |
| 4,133,325 | 1/1979 | West .................................. 123/416 |
| 4,157,699 | 7/1979 | Mori .................................. 123/417 |
| 4,175,507 | 11/1979 | Kawai et al. . |
| 4,198,941 | 4/1980 | Oishi ................................. 123/418 |
| 4,201,159 | 5/1980 | Kawai et al. ....................... 123/480 |
| 4,225,925 | 9/1980 | Hattori et al. ..................... 123/416 |
| 4,314,540 | 2/1982 | Ikeura .............................. 123/417 |

FOREIGN PATENT DOCUMENTS

| | | |
|---|---|---|
| 2357701 | 6/1974 | Fed. Rep. of Germany . |
| 2623910 | 12/1976 | Fed. Rep. of Germany . |
| 2732471 | 2/1978 | Fed. Rep. of Germany . |
| 2749981 | 6/1978 | Fed. Rep. of Germany . |
| 2742863 | 7/1978 | Fed. Rep. of Germany . |
| 1247738 | 9/1971 | United Kingdom . |
| 1247739 | 9/1971 | United Kingdom . |
| 1262450 | 2/1972 | United Kingdom . |
| 1285106 | 8/1972 | United Kingdom . |
| 1300396 | 12/1972 | United Kingdom . |
| 1428520 | 3/1976 | United Kingdom . |
| 1438323 | 6/1976 | United Kingdom . |
| 1444473 | 7/1976 | United Kingdom . |

Primary Examiner—Parshotam S. Lall
Attorney, Agent, or Firm—Lane, Aitken & Kananen

[57] ABSTRACT

A method and apparatus for controlling ignition system spark timing. It is detected whether the engine is under cranking or not. Means are included to provide a spark-advance characteristics when the engine is under cranking, which is separate from a spark-advance characteristic provided for the remaining engine operating conditions.

2 Claims, 6 Drawing Figures

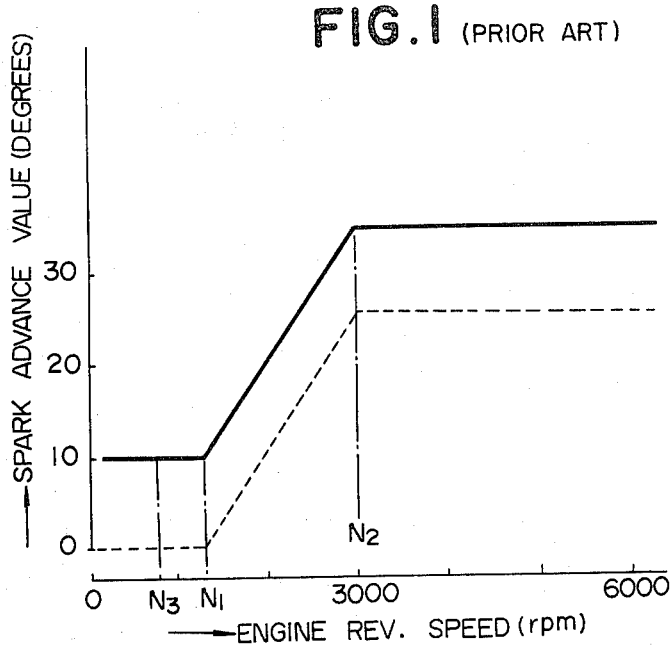
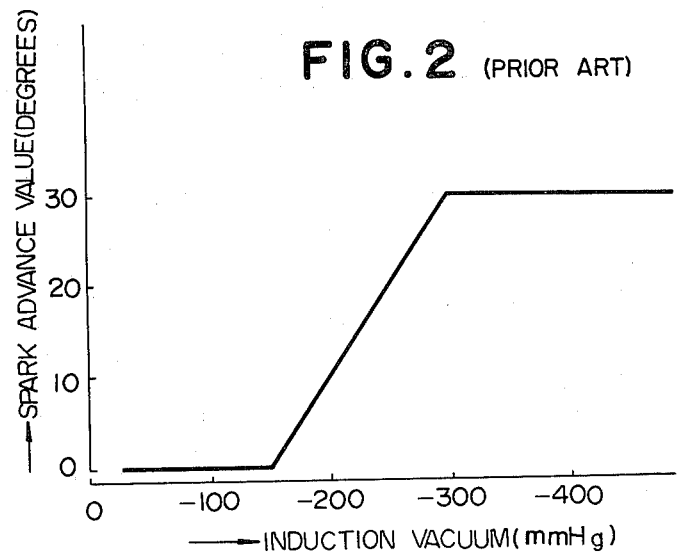

IGNITION SYSTEM SPARK TIMING CONTROL DURING ENGINE CRANKING

This application is a continuation of application Ser. No. 137,000, filed Apr. 3, 1980, now abandoned.

CROSS-REFERENCES TO RELATED APPLICATIONS

References are made to the following related co-pending applications, each filed in the name of the Kenji Ikeura on Apr. 3, 1980:

(1) U.S. patent application Ser. No. 136,959, now U.S. Pat. No. 4,367,711;
(2) U.S. patent application Ser. No. 137,001;
(3) U.S. patent application Ser. No. 136,996; and
(4) U.S. patent application Ser. No. 136,994, now U.S. Pat. No. 4,314,540, issued Feb. 9, 1982.

BACKGROUND OF THE INVENTION

The present invention relates to a method and apparatus for the control of an ignition system spark timing for a spark ignition internal combustion engine, and more particularly to a method and apparatus for the control of an ignition system spark timing during cranking of a spark ignition internal combustion engine.

Description is now provided concerning the conventional art and the problems associated therewith. The spark timing control system for an internal combustion engine adjusts the timing of a spark to a certain degree before the top dead center (for example, 12° BTDC/600 rpm) so as to cause the ignition to take place at the optimum instance to provide the maximum output because there is an ignition delay from the passage of a spark to the actual ignition of the fuel within the cylinder of the engine. The ignition delay in terms of time is substantially unchanged even if the engine revolution speed increases, but if it is considered in terms of crank angle, the ignition delay increases in accordance with an increase in the engine revolution speed because the piston speed increases in accordance with the increase in engine revolution speed. Thus, a centrifugal spark advance controller of the mechanical type, for example, is operatively connected to a distributor, thereby to advance the spark timing in accordance with an increase in the revolution speed because if the spark timing remains in the same level as that for the low revolution speed, an adequate output characteristic can not be provided when the revolution speed increases.

FIG. 1 is a graph showing one example of the spark advance characteristic provided by the conventional centrifugal advance controller, wherein the axis of abscissa designates engine revolution speed and the axis of ordinate designates spark advance value. Letter $N_1$ designates a revolution speed beyond or above which spark advance value increases, letter $N_2$ designates a revolution speed beyond or above which spark advance value becomes maximum, and letter $N_3$ designates an idling speed, the solid line designates the spark advance characteristic when the engine temperature is within an ordinary-in-use range, and the broken line designates the spark advance characteristic when the engine is within a low temperature range. This is often called the "two-point method" which is characterized by selective use of two separate spark advance characteristics by switching in response to the low engine temperature range or the ordinary-in-use engine temperature range.

Induction vacuum as the engine is operating has a great influence on the ignition delay. Namely, since when the induction vacuum is great, i.e., when the throttle valve opening degree is small, the amount of air-fuel mixture inducted into a cylinder is little and the pressure within the cylinder is low even at the end of compression, thereby to cause a reduction in flame propagation, causing a drop in performance. As a countermeasure to this, it has been the conventional practice to provide a distributor with a vacuum spark advance controller.

FIG. 2 is a graph showing one example of a spark advance characteristic provided by the conventional vacuum advance controller, wherein the axis of abscissa designates induction vacuum, and the axis of ordinate designates spark advance value.

In the spark timing control system as mentioned above, the initial setting of spark timing is determined by means of mechanical position setting and the spark advance value is variable with respect to engine revolution speed and load, so that the spark advance during engine cranking can not help taking the same value as the spark advance value at idling. It has been a practice to use two-stage spark advance characteristic as shown by the solid line and the broken line in FIG. 1, but it has a problem in that switching is necessary in response to temperature, resulting in deterioration in manipulability and cost increase, and that the allowable choice is between two different values only.

SUMMARY OF THE INVENTION

An object of the present invention is to improve the start-up of a spark ignition internal combustion engine when the engine is under cranking even if the engine temperature is low. The method and apparatus provide a system wherein, when the engine is under cranking, the value of spark advance is minutely set in accordance with the engine temperature.

The method and apparatus of the invention concerns the control wherein it is detected whether a spark ignition internal combustion engine is under cranking or not, and a spark-advance characteristic is provided when the engine is under cranking, which is distinct from a spark-advance characteristic to be used during the remaining engine operating conditions.

Another aspect of the invention is in that the value of spark advance is determined in accordance with the engine temperature.

Still another aspect of the invention is in that a microcomputer provides a spark-advance characteristic by digital operation.

Still another aspect of the invention is in that a microcomputer finds by table look-up a value of spark advance in accordance with the engine temperature.

The invention may be better understood by reference to the detailed description which follows and to the drawings.

BRIEF DESCRIPTION OF THE DRAWINGS

FIG. 1 is a graph of engine-speed spark-advance versus engine speed according to the conventional art;

FIG. 2 is a graph of induction-vacuum spark-advance versus induction vacuum according to the conventional art;

DETAILED DESCRIPTION OF THE INVENTION

Figure 3:
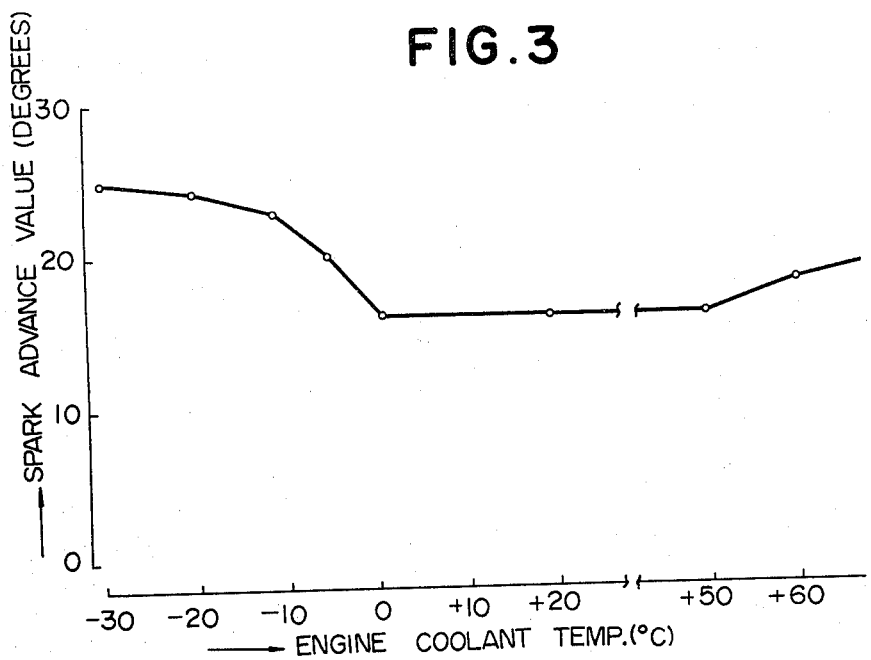
FIG. 3 is a graph of engine-coolant spark-advance versus engine temperature according to the present invention.

FIG. 3 is a graph showing a characteristic of a relationship between engine temperature and spark advance which is employed in the present invention particularly within a low engine temperature range. This shows a case wherein engine coolant temperature is employed as a representative of the engine temperature. Since there exists a time interval between the passage of a spark and the instance when the maximum pressure is attained as a result of combustion of the air fuel mixture within the cylinder, the spark advance is determined taking into account the ignition delay in such a manner that the maximum pressure occurs at the instance when the conversion coefficient from heat energy to mechanical energy is the greatest.

During engine start-up, i.e., when under cranking, it is necessary when the engine temperature is low to provide a relatively great spark advance value because there is a considerable delay in combustion under this low engine temperature condition. Therefore, if the optimum spark advance values for engine cranking are preset corresponding to various engine temperatures, the start-up performance improves. Within a region wherein the engine start-up performance is poor, that is, the engine is difficult to start, under a low temperature range, particularly under such a low temperature below zero degrees centigrade, when the battery condition and the fuel atomization state are bad, a great improvement in the engine start-up performance can be accomplished by providing spark advance values each corresponding finely to each engine temperature value. Furthermore, describing the example of the characteristic shown in FIG. 3, when the coolant temperature is $-30°$ C., for example, the optimum value is 25° before the top dead center (BTDC), while, when the coolant temperature is $-5°$ C., the optimum value is 20° BTDC, and when the coolant temperature is $+20°$ C., the optimum value is 16° BTDC. However, if the spark is advanced to 25° C. at the temperature of $-5°$ C., the combustion advances before the piston reaches the top dead center (TDC), thus reversing the engine and causing the engine to stall, and if the spark is advanced to 20° C. only at the temperature of $-30°$ C., the combustion advances in a delayed manner, failing to provide sufficient torque and making it quite difficult to start the engine. In each of the cases, therefore, the start-up performance is bad. It will now be understood that a sufficient effect can not be expected by selectively providing two advance values and thus it is quite necessary to finely provide spark advance values particularly under low engine temperature conditions.

Upon cranking of the engine at a high engine temperature or right after high speed cruising, the combustion delay is relatively great so that it is often preferable to provide great spark advance values. In this case, the optimum value of spark advance depends upon the state of the fuel rather than the coolant temperature so that the same effect as provided by the coolant temperature-dependent fine control of the spark advance value at low engine temperatures can not be expected.

Figure 4:
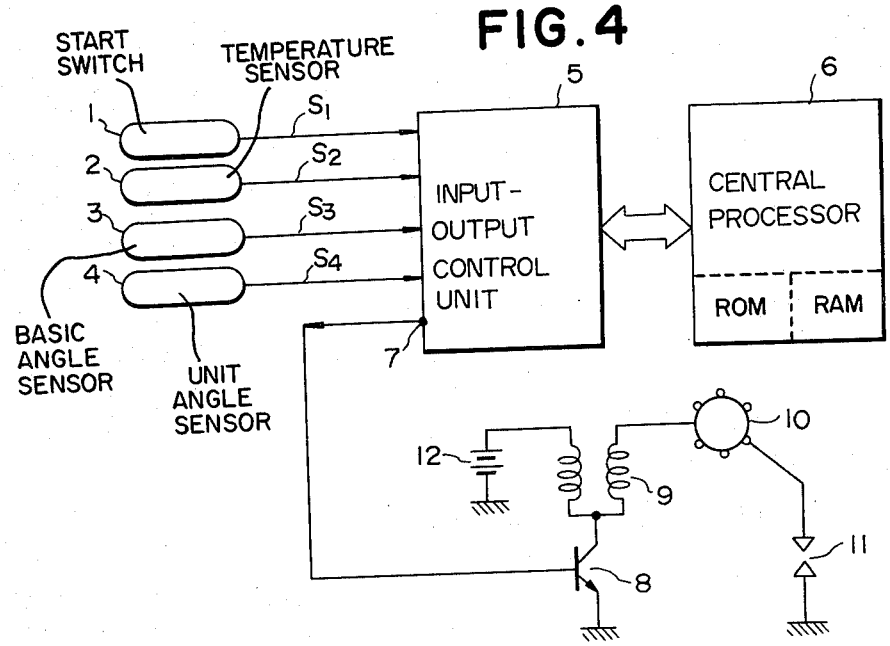
FIG. 4 is a block diagram illustrating one embodiment of the present invention.

FIG. 4 is a block diagram showing an embodiment according to the present invention, wherein the spark advance value is set using a microcomputer. In FIG. 4, the reference numeral 1 designates a start switch which provides an ON or OFF signal $S_1$ in response to whether the engine is under cranking or not. The numeral 2 designates a temperature sensor which provides a signal $S_2$ which varies in response to the engine coolant temperature, numeral 3 designates a basic angle sensor which provides basic angle pulse signals $S_3$ each upon an expiration of a basic angle (for example 120°) as crank shaft rotates, and numeral 4 designates a unit angle sensor which provides unit angle pulse signals $S_4$ each upon an expiration of a unit angle (for example 1°) as the crank shaft rotates. These signals $S_1$ to $S_4$ are read in via an input-output control unit 5 that is constructed of semiconductors by a central processor 6 including a ROM (read only memory), a RAM (random access memory), and a CPU (central processor unit). The central processor 6 finds whether the engine is under cranking or not and the engine coolant temperature from the read-in signals $S_1$ and $S_2$, determines the optimum spark advance value by calculation or table look-up, and instructs this value to that section of the input-output control unit 5 which performs the spark advance control. The input-output control unit 5 provides, at a spark output terminal, the instructed spark advance value in accordance with timing decided from the basic angle pulse signal $S_3$ and the unit angle pulse signal $S_4$, thus controlling the operation of a transistor 8 which turns on or off an electric current passing through an ignition coil 9 of an ignition circuit. The reference numeral 10 designates a distributor, numeral 11 designates a spark plug, and numeral 12 designates a battery for an electric source.

Referring to the way to determine spark advance values within the central processor 6, it is preferred to find by table look-up from the optimum spark advance values, stored in memory, for various values of output signals $S_2$ of the temperature sensor 2. However, if the capacity for the program and the memory is restricted, it is possible to find by calculation a using mathematical formula including the output signal $S_2$ of the temperature sensor 2.

As a means for detecting the temperature condition of the engine, a temperature sensor to detect engine coolant temperature is appropriate from the view point of common-in-use of information. However, in placing an emphasis on engine start-up performance, an oil temperature sensor, a cylinder block temperature sensor an, a cylinder head temperature sensor have a close relation with the start-up performance within a low engine temperature range, and atmospheric temperature sensor and a fuel temperature sensor can be used to accomplish the object of the present invention although they do not detect the engine temperature. Of course, if two or more of the different temperature sensors are combined, the degree of precision in the control improves.

Figure 5:
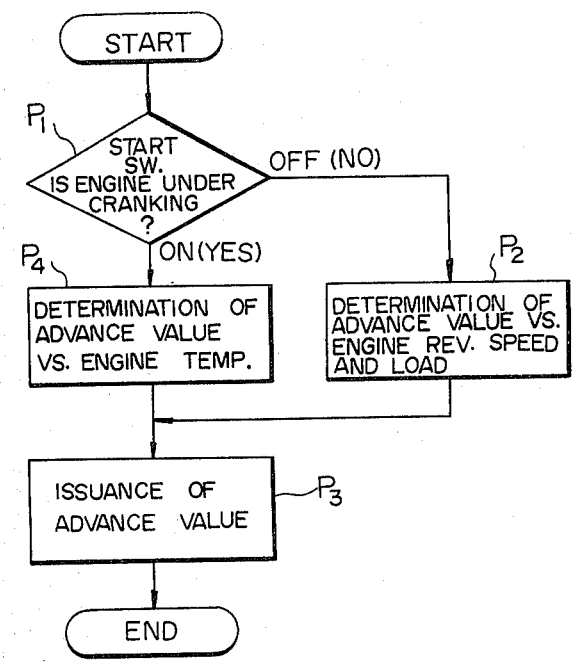
FIG. 5 is a flow chart illustrative of the operation of the processor used to determine the value of spark advance.

FIG. 5 shows a flow chart illustrative of the operation of the central processor 6 from the determination of spark advance values up to the output. When the program starts, a decision is made in step $P_1$ whether the engine is under cranking or not as represented by the ON state or the OFF state of the start switch 1, and if the engine is not under cranking, the program goes to step $P_2$ wherein the optimum spark advance value is determined in accordance with the engine revolution speed and load and this value is issued via step $P_3$. If, in step $P_1$, it is decided that the engine is under cranking, the program goes to step $P_4$ wherein the optimum spark advance value corresponding to engine coolant temperature is found by table look-up or calculation and this value is issued via step $P_3$.

Figure 6:
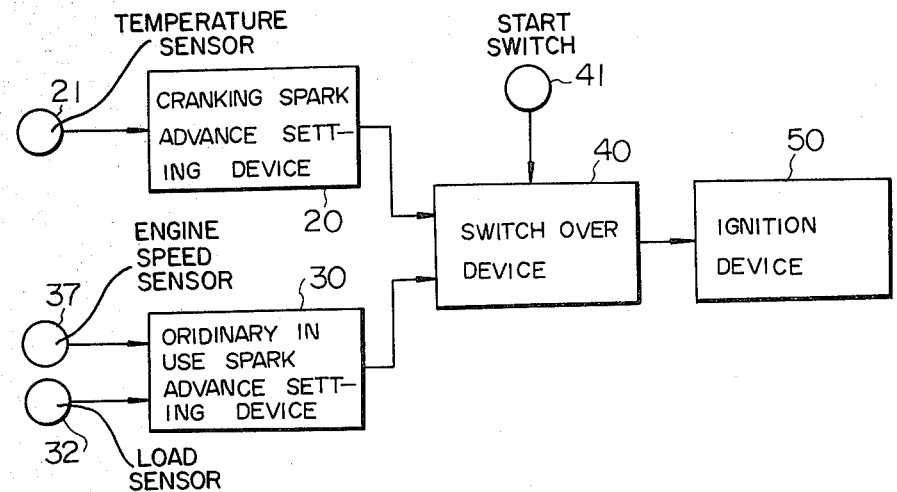
FIG. 6 is a block diagram illustrating another embodiment of the present invention.

FIG. 6 is a block diagram showing the other embodiment of the present invention wherein an analog circuit is used. In FIG. 6, the reference numeral 20 designates a cranking spark advance setting device, numeral 30 designates an ordinary-in-use spark advance setting device, numeral 40 designates a switch-over device, and numeral 50 designates an ignition device. The cranking spark advance setting device 20 provides by calculation a spark advance value in accordance with the engine coolant temperature detected by the temperature sensor 21. The ordinary-in-use spark advance setting device 30 provides by calculation a spark advance value in accordance with the load detected by the load sensor 32. The switch-over device 40 connects an output of the start-up spark advance device 20 to the ignition device 50 when the start switch 41 provides an ON signal (that is, during start-up), and connects an output of the normal spark advance setting device 30 to the ignition device 50.

As having been described above, the present invention can be constructed either of a digital system or an analog system. However, if particularly the digital system using the microcomputer is employed, there is an advantage that good start-up performance is provided without any considerable cost increase because it is possible to finely and accurately set the optimum spark advance value corresponding to each of the temperature values instead of approximating the optimum values with a straight line or a bent line, and because each of the input signals can be in common use with an electronic fuel injection control system or an exhaust gas recirculation control system.

It will now be understood that according to the present invention it is made possible to provide the optimum start-up spark advance values in accordance with engine warm-up conditions because of the construction that spark advance values are determined in response to engine temperature states upon cranking of the engine as a result of a decision whether the engine is under cranking or not, thus considerably improving engine start-up especially under low engine temperature.

In the practice of the invention, the inventor has used a Hitachi Model No. HD 46802 central processor. A Hitachi Model No HD 46506 input-output control unit compatible with the processor has been used.

The start switch 1 is entirely conventional and may be a pair of contacts which are closed while the engine starter motor is in operation.

The basic angle sensor and unit angle sensor are also conventional and may be in the form of a detecting unit 24 described in U.S. Pat. No. 4,015,565, filed Apr. 5, 1977 in the name of Aono et al. and entitled "SPARK-ADVANCE CONTROL APPARATUS FOR INTERNAL COMBUSTION ENGINE" (which is incorporated herein by reference) or may be in the form of a speed-electrical transducer 10 described in U.S. Pat. No. 3,853,103, filed Dec. 10, 1974 in the name of Wahl et al. (assignee: Robert Bosch GmbH) and entitled "IGNITION TIMING CONTROL SYSTEM FOR INTERNAL COMBUSTION ENGINE IGNITION SYSTEMS" (which is also incorporated herein by reference).

A way to find or sense revolution speed of engine, i.e., engine rpm, based upon a signal from the unit angle sensor is conventional and described in the above-mentioned U.S. Pat. No. 3,853,103. In this respect, reference is made to U.S. Pat. No. 3,969,614, filed July 13, 1976 in the name of Moyer et al. and entitled "METHOD AND APPARATUS FOR ENGINE CONTROL" and reference is also made to U.S. Pat. No. 4,009,699, filed Mar. 1, 1977 in the name of Hetzler et al. and entitled "DIGITAL IGNITION SPARK TIMING ANGLE CONTROL WITH READ ONLY MEMORY."

The inventor has used a breakerless ignition system employing an ignition coil and a power transistor.

A way to determine the instance of ignition based upon binary signals of the basic angle sensor and unit angle sensor is disclosed in U.S. Pat. No. 3,853,103 in the name of Wahl et al. and U.S. Pat. No. 4,015,565 in the name of Aono et al.

In a four-cylinder, four-cycle internal combustion engine, each one ignition pulse must be obtained after each revolution of the crank shaft by 180°; i,e. at 180° after the first ignition pulse is derived, a second basic angle pulse must then be provided by the basic angle sensor. In this case, the basic angle sensor must be designed to provide a basic angle pulse after each revolution of the crank shaft by 180°.

In a six-cylinder, four-cycle internal combustion engine, each one ignition pulse must be obtained after each revolution of the crank shaft by 120°; i.e. at 120° after the first ignition pulse is derived, a second basic angle pulse must then be provided by the basic angle sensor. In this case, the basic angle sensor must be designed to provide a basic angle pulse after each revolution of the crank shaft by 120°.

What is claimed is:

1. A method of controlling an ignition system spark timing for a spark ignition internal combustion engine, comprising the steps of:
    (a) sensing the engine temperature and generating an engine temperature signal indicative of the sensed engine temperature;
    (b) detecting a mode of operation when the engine is being cranked and generating an output signal;
    (c) finding in response to said engine temperature signal and output signal by table look-up in a read only memory a value of spark advance which corresponds to the sensed engine temperature, said read only memory having a plurality of spark advance values and a plurality of corresponding engine temperature values stored therein, which spark advance values and corresponding engine temperature values define a two dimensional table, said two dimensional table having a first zone in which the values of spark advance decrease with an increase in engine temperature, a second and subsequent zone in which the values of spark advance remain essentially constant with an increase in engine temperature, and a third and subsequent zone in which the values of spark advance increase with an increase in engine temperature, the values of engine temperature in said first zone being lower than the values of engine temperature in said second zone and the values of engine temperature in said second zone being lower than the values of engine temperature in said third zone; and (d) providing a spark advance determined by said table look-up as a value of spark advance.

2. An apparatus for the control of an ignition system spark timing for a spark ignition internal combustion engine, said apparatus comprising:
   a temperature sensor which senses the temperature of the engine and generates an engine temperature signal indicative of the sensed engine temperature;
   an engine cranking sensor which detects a mode of operation when the engine is being cranked and generates an output signal; and
   a computer including a read only memory, said computer being responsive to said engine temperature signal and said output signal to find by table look-up in said read only memory a value of spark advance which corresponds to the sensed engine temperature, said read only memory having a plurality of spark advance values and a plurality of corresponding engine temperature values stored therein, said spark advance values and corresponding engine temperature values defining a two dimensional table, said two dimensional table having a first zone in which the values of spark advance decrease with an increase in engine temperature, a second and subsequent zone in which the values of spark advance remain substantially constant with an increase in engine temperature, and a third and subsequent zone in which the values of spark advance increase with an increase in engine temperature, the values of engine temperature in said first zone being lower than the value of engine temperature in said second zone and the values of engine temperature in said second zone being lower than the values of engine temperature in said third zone; said computer providing a spark advance determined by said table look-up as a value of spark advance.

* * * * *